March 20, 1945.　　　W. E. WHITE　　　2,371,938
VALVE GRINDER
Filed April 21, 1943　　　2 Sheets-Sheet 1

Inventor
William E. White
By Clarence A. O'Brien
and Harvey B. Jacobson
Attorneys

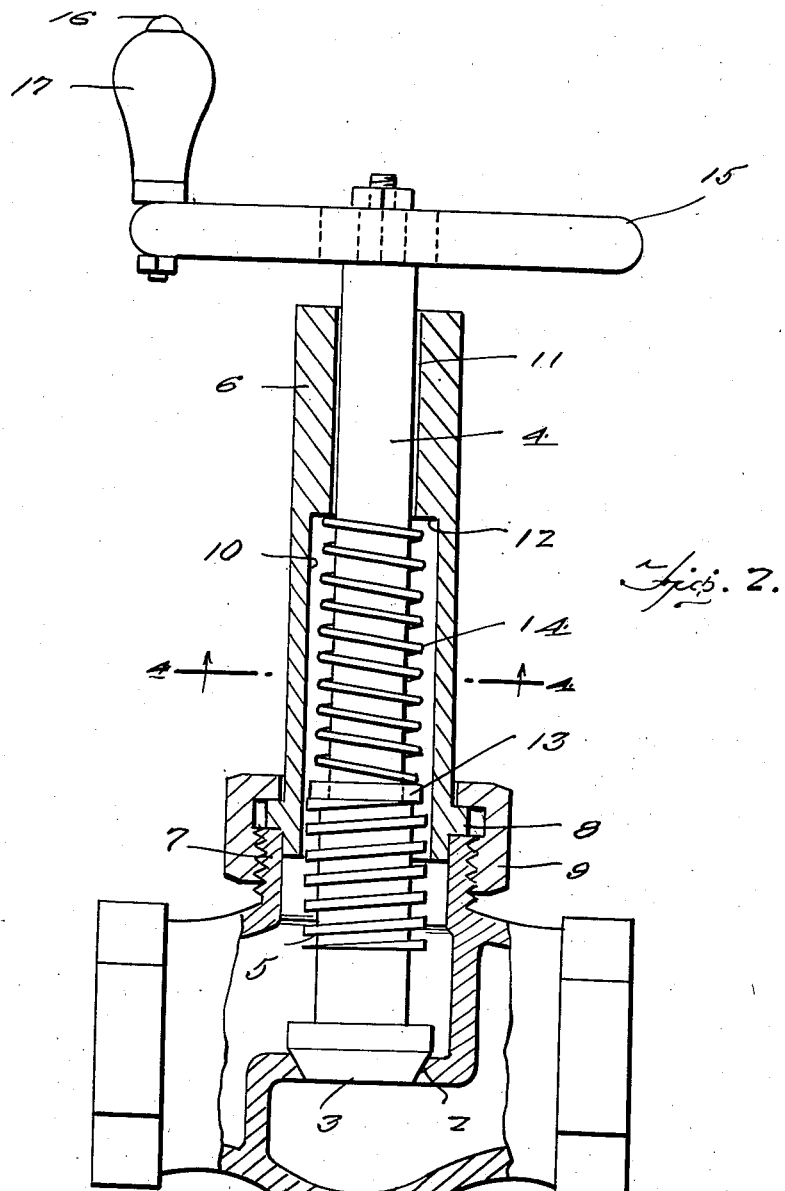

Patented Mar. 20, 1945

2,371,938

UNITED STATES PATENT OFFICE 2,371,938

VALVE GRINDER

William E. White, Aliquippa, Pa.

Application April 21, 1943, Serial No. 483,944

1 Claim. (Cl. 51—27)

The present invention relates to new and useful improvements in globe or angle valve grinders and has for its primary object to provide, in a manner as hereinafter set forth, novel means for rotatably actuating the head or valve member on the seat for expeditiously renewing the opposed contacting surfaces.

Another very important object of the invention is to provide novel means for grinding globe or angle valves without the necessity of removing them from the pipe line.

Other objects of the invention are to provide a globe or angle valve grinder of the character described which will be comparatively simple in construction, strong, durable, highly efficient and reliable in use, compact and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 2 is a view principally in vertical section, taken substantially on the line 2—2 of Figure 1.

Figure 1:
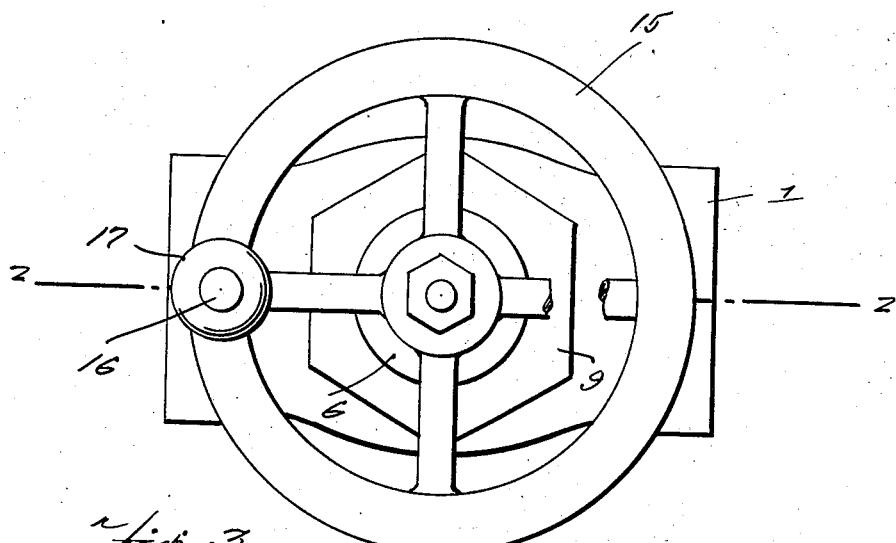
Figure 1 is a top plan view, showing a grinder constructed in accordance with the present invention applied to a globe valve.
Figures 3, 4:
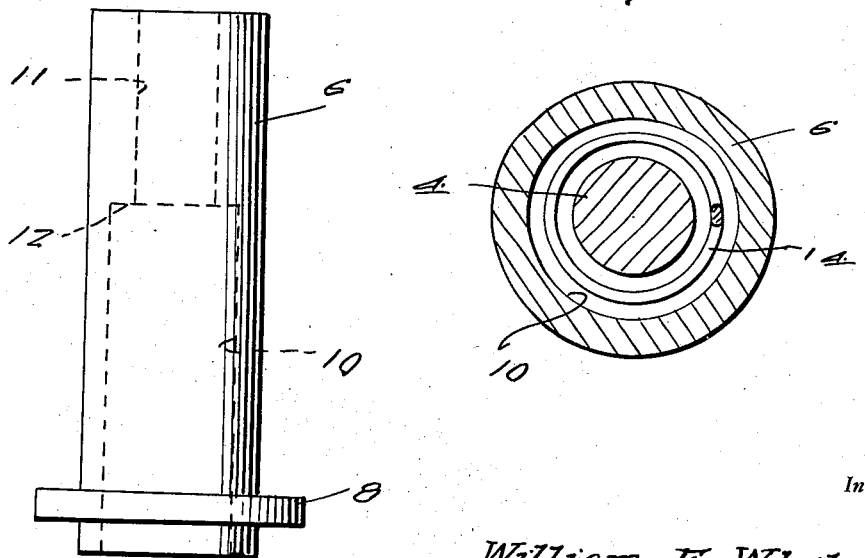
Figure 3 is a detail view in elevation of the tubular guide.
Figure 4 is a view in horizontal section, taken substantially on the line 4—4 of Figure 2.

Referring now to the drawings in detail, it will be seen that reference numeral 1 designates a conventional valve body having the usual seat 2 therein. A valve member or head 3 on one end of a stem 4 is engageable with the seat 2. The stem 4 includes an enlarged, threaded portion 5 for operatively mounting said stem in the upper portion of the body 1 for adjustment in the usual manner toward and away from the seat 2.

The embodiment of the present invention which has been illustrated comprises a tubular metallic guide 6 the lower portion of which is engageable in the usual upstanding, externally threaded neck 7 of the valve body 1. A flange 8 on the lower portion of the guide 6 rests on the neck 7. An internally flanged nut 9 encircles the guide 6 and is engaged with the flange 8, said nut being threaded on the neck 7 for firmly securing said guide in position thereon.

The stem 4, which is rotatable and slidable in the guide 6, is inserted in said guide prior to the application thereof to the body 1. The bore 10 of the tubular guide 6 is provided with a reduced upper portion 11 which provides a shoulder 12 in said guide. A washer 13 is rotatably mounted on the stem 4 prior to its insertion in the guide 6 and rests on the shoulder provided by the threaded portion 5 of the stem. A coil spring 14 is mounted on the stem 4 between the shoulder 12 and washer 14.

Removably secured on the upper end of the stem 4 is a wheel 15. An upstanding bolt 16 is mounted on the peripheral portion of the wheel 15. An operating handle 17 for the wheel 15 is journaled on the bolt 16.

It is thought that the manner of using the invention will be readily apparent from a consideration of the foregoing. Briefly, the valve is disassembled to permit removal of the stem 4 therefrom. The washer 13 and the coil spring 14 are slipped on the stem 4 and said stem is inserted through the guide 6. The nut 9 is then slipped over the guide 6 and screwed down on the neck 7 for firmly securing said guide in position thereon. This compresses the coil spring 14 and engages the head 3 with the seat 2. The wheel 15 is then applied to the upper end of the stem 4. A suitable grinding compound having first been applied to the seat 2, the grinder is now ready for operation. The coil spring 14 yieldingly urges the head 3 against the seat 2 and the opposed, contacting surfaces are ground and polished in a manner which is thought to be obvious as the stem 4 is turned through the medium of the wheel 15.

It is believed that the many advantages of a valve grinder constructed in accordance with the present invention will be readily understood and although a preferred embodiment of the device is as illustrated and described, it is to be understood that changes in the details of construction and in the combination and arrangement of parts may be resorted to which will fall within the scope of the invention as claimed.

Having described the invention, what is claimed as new is:

In an attachment for re-grinding the worn seat and its cooperating valve stem-head of a valve without removing the valve body from the pipe line in which it is installed, comprising a tubular guide-member adapted to be clamped against the valve body at the stem opening and in vertical, axial alignment with the valve seat, the outermost end of said guide-member having a bore to snugly receive and guide the valve-stem; the lowermost end of said guide-member provided with an enlarged bore so as to form an internal shoulder at the junction of said bore and said enlarged bore; said enlarged bore adapted to accommodate a compression spring which encircles the valve stem and is held in yielding position between the internal shoulder and the operating threads of the stem for yieldingly urging the head of the stem against the seat; the attaching end of said guide-member provided with an annular flange integral and above the lowermost end of the guide-member so as to provide an entrant end which snugly fits into the upper end of the neck of the valve; a flanged nut screwed upon said neck for clamping said guide member to said valve body and means for rotating the valve stem in the guide-member.

WILLIAM E. WHITE.